April 21, 1931. T. C. MOORSHEAD 1,802,031
GLASS SHAPING MACHINE
Filed June 18, 1929
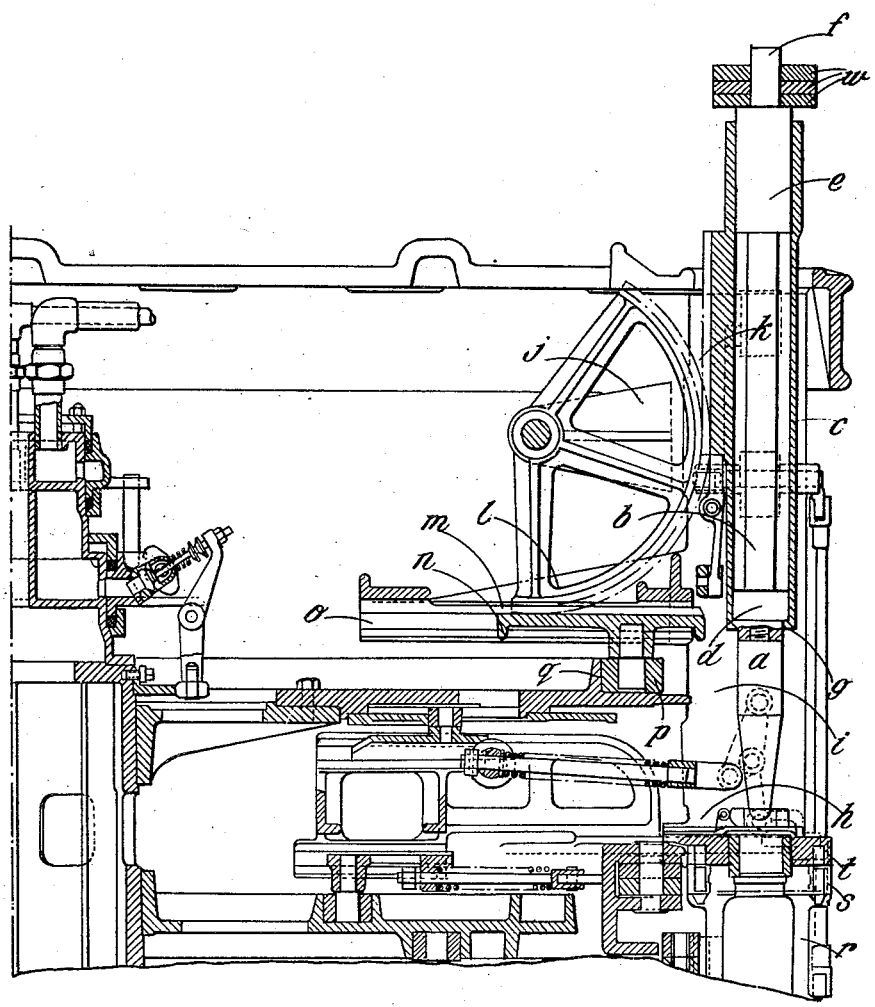

Patented Apr. 21, 1931

1,802,031

UNITED STATES PATENT OFFICE

THOMAS COURTNEY MOORSHEAD, OF LONDON, ENGLAND, ASSIGNOR TO THE UNITED GLASS BOTTLE MANUFACTURERS, LIMITED, OF LONDON, ENGLAND, A BRITISH COMPANY

GLASS-SHAPING MACHINE

Application filed June 18, 1929. Serial No. 371,866.

This invention relates to glass shaping machines of the type in which a pressing plunger is employed for the purpose of forming, or assisting in the forming of a cavity, in the molten glass.

Hitherto it has been almost universal practice to employ compressed air for the application of the pressing force to the pressing plunger, the compressed air being admitted to a cylinder containing a piston which is attached to a rod or ram carrying the plunger. Also, in some instances, the pressing plunger has been operated by means of a cam acting upon gearing or a linkage yieldably connected to the plunger through one or more strong springs. Both of these expedients have for their object the provision of a means which will enable a predetermined pressure suitable to the ware being formed, to be applied to the glass irrespective of the travel of the plunger, it being understood that the travel varies in accordance with the variations in the amount of glass contained in the parison mould from one gather to another. It is important for this pressure to be maintained constant as, if there is a comparatively small variation from the correct pressing pressure, defective ware is produced, under pressing resulting in in-complete moulding of the articles in the moulds and over-pressing producing a variety of defects well known in the glass industry. Compressed air as a means for applying the pressing pressure possesses the drawback that, in practice, it is almost impossible to maintain it at a constant pressure and further, that it cannot conveniently be varied when a different type of ware is to be pressed and the employment of a spring for the accommodation of differences in travel of the plunger is inconvenient since it cannot do so without adjustments of the pressure applied by the spring to the plunger. The present invention, therefore, has for its chief object the actuation of a pressing plunger by means which are independent of compressed air or springs.

According to the invention means is provided whereby the parison can be formed in the parison mould by the lowering of a pressing plunger actuated by the force of gravity only. The plunger may be formed so that its weight, together with that of the plunger stem, is sufficient for the purpose but it is preferred that the plunger stem should be formed so as to permit one or more removable weights to be applied thereto in order to suit the requirements of various types of ware. The plunger is preferably arranged so that it is suspended from, and slidably mounted in, the lower end of a vertically movable housing or crosshead, the travel of the latter being such that the lower end of the plunger is adapted to be brought into contact with the glass in the mould before the housing reaches the end of its downward stroke so that the glass will be pressed by the action of gravity on the pressing plunger during the period that the latter is unsupported by the housing. The plunger, the plunger housing, the parison mould and other parts are preferably mounted on a framework or carrier which is rotatably mounted on a central support in a manner well known in connection with machines of the type above referred to and the means for raising and lowering the housing may comprise a toothed sector and a cam operated toothed rack arranged so that the sector is adapted to be rotated about a pivotal support and the plunger raised and lowered at appropriate intervals during the rotary movement of the carrier.

In order that the said invention may be clearly understood and readily carried into effect, the same will now be described more fully with reference to the accompanying drawing which illustrates, by way of example, one convenient mode of carrying the invention into effect as applied to a glass shaping machine of the type described in the specification of Patent No. 281,383.

The pressing plunger comprises a parison former $a$ and a plunger stem $b$ to which the former is attached. At its upper end the stem is provided with an extension $f$ for the purpose of enabling one or more removable weights W to be applied thereto. The extension $f$, weights W, and collars $d$ and $e$ also comprise part of the pressing plunger. The housing $c$ is provided at its lower end with an inwardly extending shoulder $g$ against which the collar $d$ is adapted to bear, the said collar being normally held against this shoulder by the weight of the plunger.

$h$ is a part of the rotary carrier by which the pressing plunger, the plunger housing $c$ and other parts of the machine are carried. The carrier is provided with a plurality of upwardly projecting members $i$ upon which are carried brackets $j$. On one side of the housing $c$ a toothed rack $k$ is formed for engagement with a toothed sector $l$ which is mounted in the brackets $j$ so that it can be rotated about a horizontal axis. The toothed sector also engages a horizontally disposed rack $m$ on a slide $n$ which is guided within another bracket $o$ mounted on the rotary carrier. The slide $n$ carries a roller $p$ engaging a cam track $q$ which is secured to the central support on which the carrier $h$ is rotatably mounted, the arrangement being such that, as the carrier revolves, the slide $n$ will be caused to move in and out in a radial direction, the toothed sector $l$ caused to rotate about its horizontal axis and the plunger $a$ raised and lowered.

$r$ is one of the parison moulds with which the pressing plunger co-operates, which moulds are also carried by the rotary carrier. $s$ is a neck mould disposed directly over the upper end of the parison mould and $t$ is a register head for holding the parison and neck moulds in correct alignment. For further description of these parts of the machine and the manner in which they co-operate with the plunger mechanism reference should be made to specification of Patent No. 281,383.

In operation, the crosshead or housing $c$ is caused, at the appropriate time, to descend until the plunger carried by the housing, enters the glass in the mould $r$ and the glass offers a resistance sufficient first to retard and later to arrest its downward movement. The crosshead $c$ continues and completes its downward movement while the plunger remains stationary and supported by the glass. Thus the glass in the mould is pressed solely by the action of gravity of the plunger and any additional masses which are carried thereby. After an interval of time sufficient to enable the glass to set has elapsed, the housing is raised and during its upward movement the shoulder $g$ is again brought into contact with the collar $d$ on the plunger stem and the plunger raised out of the mould. The plunger is then held in this position until another gather of glass has been delivered to the mould and is ready for pressing.

It will be appreciated that the invention is not confined to machines of the character shown in specification No. 281,383 and is capable of being applied both to machines which are employed for making press ware and to machines which are employed for making press and blow ware.

What I claim and desire to secure by Letters Patent of the United States is:—

1. In a glass shaping machine, the combination of a mould open at its upper end, a vertically movable pressing plunger of predetermined weight, means for raising and lowering the pressing plunger, and means whereby, during the latter part of its downward stroke, the pressing plunger is caused to press on the glass in the mould under the influence of its own weight alone so that the plunger can exert the same pressure on the glass during successive operations, irrespective of the distance of travel of the plunger.

2. In a glass shaping machine, the combination of a mould open at its upper end, a weighted pressing plunger movable into and out of the said mould, a housing within which the pressing plunger is free to slide and from which it is suspended, and means for raising and lowering the housing so that the plunger presses on the glass in the mould by its own weight alone and exerts the same pressure on the glass during successive operations irrespective of the distance of travel of the plunger.

3. In a glass shaping machine, the combination of a mould open at its upper end, a vertically movable pressing plunger of predetermined weight, means for raising and lowering the pressing plunger, means whereby, during the latter part of its downward stroke, the pressing plunger is caused to press on the glass in the mould under the influence of its own weight alone so that the plunger can exert the same pressure on the glass during successive operations, irrespective of the distance of travel of the plunger, and a support on said plunger for receiving weights.

THOMAS COURTNEY MOORSHEAD.